(12) United States Patent
Pedlar et al.

(10) Patent No.: US 7,389,108 B2
(45) Date of Patent: *Jun. 17, 2008

(54) APPARATUS AND METHOD FOR HANDLING CELL UPDATE DURING RECONFIGURATION IN UNIVERSAL MOBILE TELECOMMUNICATIONS SYSTEM USER EQUIPMENT

(75) Inventors: David W. Pedlar, Solihull (GB); Robert J. Harrison, Hollywood (GB)

(73) Assignee: M-Stack Limited, Birmingham (GB)

(*) Notice: Subject to any disclaimer, the term of this patent is extended or adjusted under 35 U.S.C. 154(b) by 116 days.

This patent is subject to a terminal disclaimer.

(21) Appl. No.: 10/674,113

(22) Filed: Sep. 29, 2003

(65) Prior Publication Data

US 2005/0070274 A1 Mar. 31, 2005

(51) Int. Cl.
*H04Q 7/20* (2006.01)

(52) U.S. Cl. .................. 455/432.1; 455/458; 455/435.1; 370/254; 370/331

(58) Field of Classification Search .............. 455/422.1, 455/432.1, 432.2, 435.1, 435.2, 436, 458, 455/456.1, 466; 370/254, 331, 322, 329, 370/348, 350
See application file for complete search history.

(56) References Cited

U.S. PATENT DOCUMENTS

| | | | | |
|---|---|---|---|---|
| 2003/0100291 | A1* | 5/2003 | Krishnarajah et al. | 455/410 |
| 2004/0114574 | A1* | 6/2004 | Zeira et al. | 370/352 |
| 2004/0203778 | A1* | 10/2004 | Kuo et al. | 455/436 |
| 2005/0009527 | A1* | 1/2005 | Sharma | 455/445 |
| 2005/0070273 | A1* | 3/2005 | Farnsworth et al. | 455/432.1 |
| 2005/0101299 | A1* | 5/2005 | Farnsworth | 455/412.1 |
| 2005/0163074 | A1* | 7/2005 | Mella et al. | 370/329 |

* cited by examiner

*Primary Examiner*—Duc M. Nguyen
*Assistant Examiner*—Anthony S. Addy

(57) ABSTRACT

The details of an apparatus and method for handling cell update during reconfiguration in universal mobile telecommunications system user equipment are disclosed herein. When a UE receives a Reconfiguration request from a UTRAN, it sets an activation time for execution of the reconfiguration. Where a cell update is required before the reconfiguration has been applied, the UE cancels the reconfiguration and proceeds with the cell update.

6 Claims, 16 Drawing Sheets

APPARATUS AND METHOD FOR HANDLING CELL UPDATE DURING RECONFIGURATION IN UNIVERSAL MOBILE TELECOMMUNICATIONS SYSTEM USER EQUIPMENT

CROSSREFERENCE TO RELATED APPLICATION

BACKGROUND

1. Technical Field

This application relates to UMTS (Universal Mobile Telecommunications System) in general, and to an apparatus and method for handling cell update during reconfiguration in universal mobile telecommunications system user equipment in particular.

2. Description of the Related Art

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25-331 specification, v.3.15.0, referred to herein as the 25-331 specification, addresses the subject of UMTS RRC (Radio Resource Control) protocol requirements between the UMTS Terrestrial Radio Access Network (UTRAN) and the UE.

In accordance with clause 8.2.2.3 of the 25-331 specification, the UTRAN may send a reconfiguration command to the UE. The reconfiguration command includes an activation time that specifies when the reconfiguration should be applied, which can be either immediately or at some time in the future, generally up to a maximum of 2.55 seconds in the future, although usually expected to be only a few milliseconds in the future. The reconfiguration procedure is considered to be ongoing until the UE replies with a response message, which would normally be sent from the UE at or shortly after the activation time.

This procedure is illustrated in FIG. 1. A Reconfiguration command is sent from the UTRAN to the UE, with a new configuration X. The requested new configuration X, typically a dedicated physical channel, is applied at both the UE and the UTRAN at the activation time, indicated by the dotted line. The new configuration is generally applied at the UE before sending a Reconfiguration_COMPLETE response. If the reconfiguration fails for any reason, the UE will revert to its previous configuration and send a Reconfiguration_FAILURE message indicating that the reconfiguration has failed.

However, if an event occurs that requires a cell update to be invoked while the reconfiguration procedure is ongoing, the current 3GPP standards do not unambiguously define the required behaviour of the UE, so potentially leading to interoperability problems. Events requiring a cell update to be invoked are defined in clause 8.3.1.2 of the 25-331 specification and include the conditions of radio link failure, re-entering service area, RLC unrecoverable error, cell reselection and periodical cell update.

The basic cell update procedure is illustrated in FIG. 2. On the occurrence of a trigger event, the UE moves into the cell_FACH state and sends a CELL UPDATE request message to the UTRAN, which tracks the state of the UE. The UTRAN returns a CELL UPDATE CONFIRM (Y) message, where Y represents the reconfiguration carried by the CELL UPDATE CONFIRM message. Both the UTRAN and UE apply the new configuration Y and the UE sends a response to the UTRAN, confirming the completion of the reconfiguration procedure. When the procedure completes, the UTRAN knows both the state of the UE and its current configuration (FACH+Y), as required to maintain communication.

In addition to the general interaction of the cell update and reconfiguration procedures, two other scenarios need to be taken into account when designing UTRAN behaviour. The first is the crossover of the CELL UPDATE command with the Reconfiguration command, while the second is the cell update occurring while the Reconfiguration_COMPLETE message is in transit. The first of these is illustrated in FIG. 3 and the second in FIG. 4.

FIG. 3 illustrates the situation where a Reconfiguration command is issued by the UTRAN but reaches the UE after the UE has sent the CELL UPDATE command to the UTRAN. In this case, the Reconfiguration command is rejected per clause 8.6.3.11 of the 25-331 specification. Therefore, nothing happens at the activation time and both the UE and UTRAN apply the cell update configuration Y. The UE then sends a confirmatory response message and a Reconfiguration_FAILURE message to the UTRAN. FIG. 3 demonstrates that it is sensible for the UTRAN not to apply the reconfiguration (X) during the cell update, but to wait until after the cell update completes. If it applies X on receipt of the cell update response message, it must revert to the previous configuration when it receives the Reconfiguration_FAILURE message.

FIG. 4 illustrates the situation of a cell update occurring while the Reconfiguration_COMPLETE message is in transit. The UTRAN issues a Reconfiguration (X) command with an activation time. This is received by the UE and the configuration X is executed at the activation time. Subsequently, the UE issues a Reconfiguration_COMPLETE message. However, before this message reaches the UTRAN, an event occurs which triggers transmission of a CELL UPDATE command to the UTRAN. Because a C-RNTI is required to send the Reconfiguration_COMPLETE message (See 9.2.1.1.c of the 3GPP 25-321 specification) and this may not be available until the CELL UPDATE CONFIRM is received, the Reconfiguration_COMPLETE message cannot be sent until the cell update completes. The UTRAN must therefore tolerate receiving a response to the Reconfiguration command after completion of an intervening cell update.

The present invention aims to propose strategies for dealing with the interaction of a cell update procedure with a reconfiguration that has already started. A number of such strategies are detailed below, denoted B0 to B6.

SUMMARY

It is an object of the present application that an apparatus and method according to the invention may enable UE behaviour to be unambiguous when a cell update is required during an ongoing reconfiguration.

According to one aspect of the present invention, there is provided a method of performing a cell update during a reconfiguration procedure in a user equipment in a communications system, the method comprising the steps of receiving a reconfiguration command, the reconfiguration command including an activation time at which a reconfiguration is to be applied, detecting a trigger event which indicates that a cell update is required and cancelling the reconfiguration procedure in response to the trigger event.

The method may comprise cancelling the reconfiguration procedure if the trigger event occurs before the activation time.

The method may alternatively comprise cancelling the reconfiguration procedure if the trigger event occurs before the reconfiguration has been applied.

According to another aspect of the invention, there is provided user equipment for performing a cell update during a reconfiguration procedure in a communications system, the equipment comprising a receiver for receiving a reconfiguration command, the reconfiguration command including an activation time at which a reconfiguration is to be applied, an event detector for detecting a trigger event which indicates that a cell update is required and controller arranged to cancel the reconfiguration procedure in response to the trigger event.

The controller may be arranged to cancel the reconfiguration procedure if the trigger event occurs before the activation time.

The controller may alternatively be arranged to cancel the reconfiguration procedure if the trigger event occurs before the reconfiguration has been applied.

Other aspects and features of the present invention will become apparent to those ordinarily skilled in the art upon review of the following description of specific embodiments of an apparatus and method for handling cell update during an ongoing reconfiguration in a UMTS user equipment.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

Figure 5:
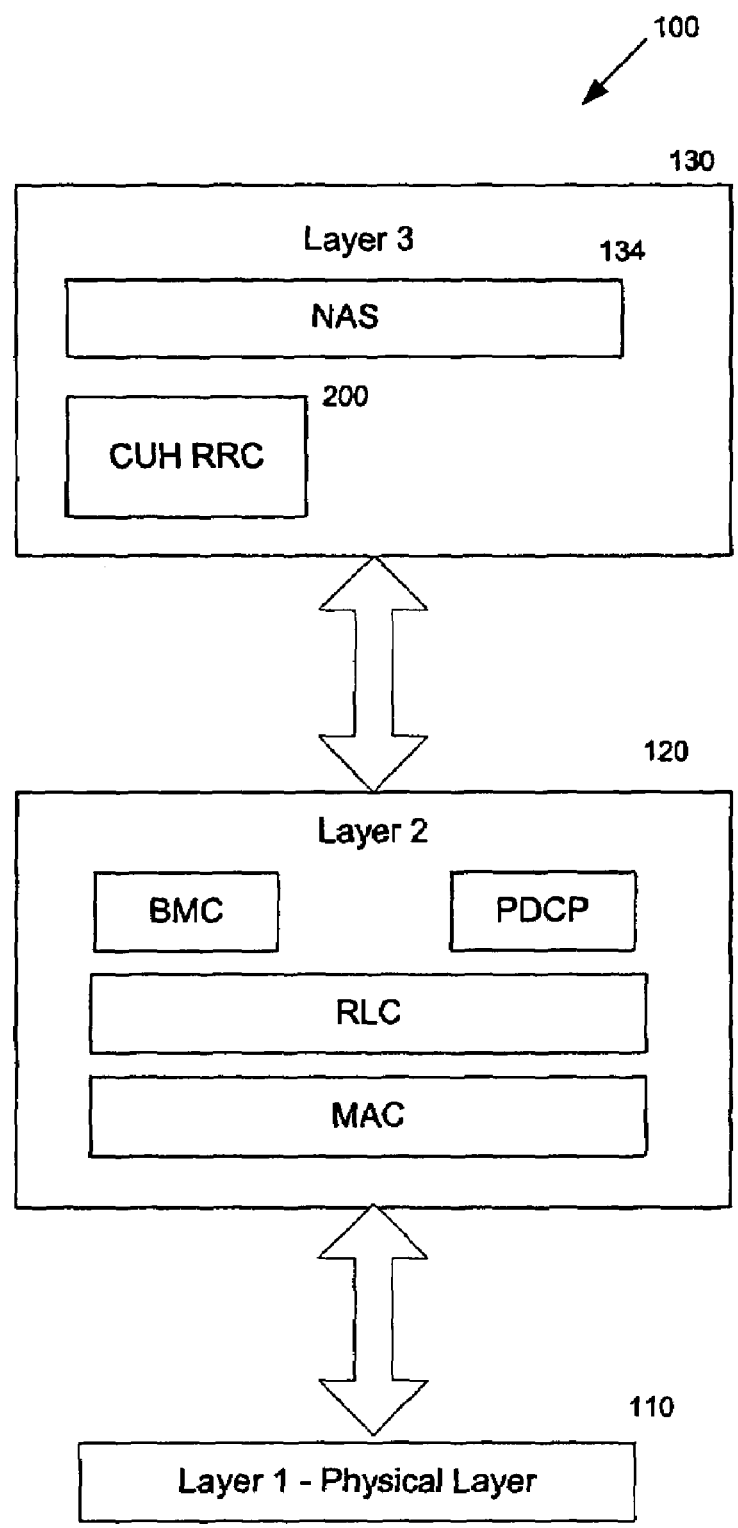
FIG. 5 is a block diagram illustrating an embodiment of a protocol stack apparatus provided with a cell update handling RRC block, in accordance with the present application.

Referring to the drawings, FIG. 5 is a block diagram illustrating an embodiment of a protocol stack apparatus provided with a cell update handling RRC block, in accordance with the present application.

The CUH RRC block (Cell Update Handling RRC) 200 is a sub layer of Layer 3 130 of a UMTS protocol stack 100. The CUH RRC 200 exists in the control plane only and provides an information transfer service to the non-access stratum NAS 134. The CUH RRC 200 is responsible for controlling the configuration of radio interface Layer 1 110 and Layer 2 120. When the UTRAN wishes to change the UE configuration it will issue a message to the UE containing a command to invoke a specific RRC procedure. The CUH RRC 200 layer of the UE decodes this message and initiates the appropriate RRC procedure. Generally when the procedure has been completed (either successfully or not) then the CUH RRC sends a response message to the UTRAN (via the lower layers) informing the UTRAN of the outcome. Although it should be noted that there are a few scenarios where the CUH RRC will not issue a response message to the UTRAN, in those cases the CUH RRC need not and does not reply.

Advantageously, the CUH RRC block 200 allows the protocol stack 100 to behave unambiguously when a cell update occurs during an ongoing reconfiguration.

The CUH RRC block 200 can implement several different behaviour strategies for coping with the interaction of a Cell Update procedure with a reconfiguration that has already started. These are summarised below, designated B0 to B6, and then explained in detail subsequently, with reference to the drawings.

Behaviour B0 involves the cell update and reconfiguration procedures continuing independently and in parallel. B1 involves delaying the start of the Cell Update procedure until the activation time of the reconfiguration has been reached and the reconfiguration has been applied. B2 involves cancelling the reconfiguration as soon as the Cell Update procedure starts. B3 involves delaying the reconfiguration until after the Cell Update procedure completes and B4 involves delaying the reconfiguration until the CELL UPDATE CONFIRM message is received. In B5, when the Cell Update procedure starts, pending reconfigurations are executed immediately. B6 is an optimised version of B1 when the UE determines that there is no need to transmit a Cell Update message to the UTRAN at all, because the reconfiguration has made it unnecessary.

Figure 6:
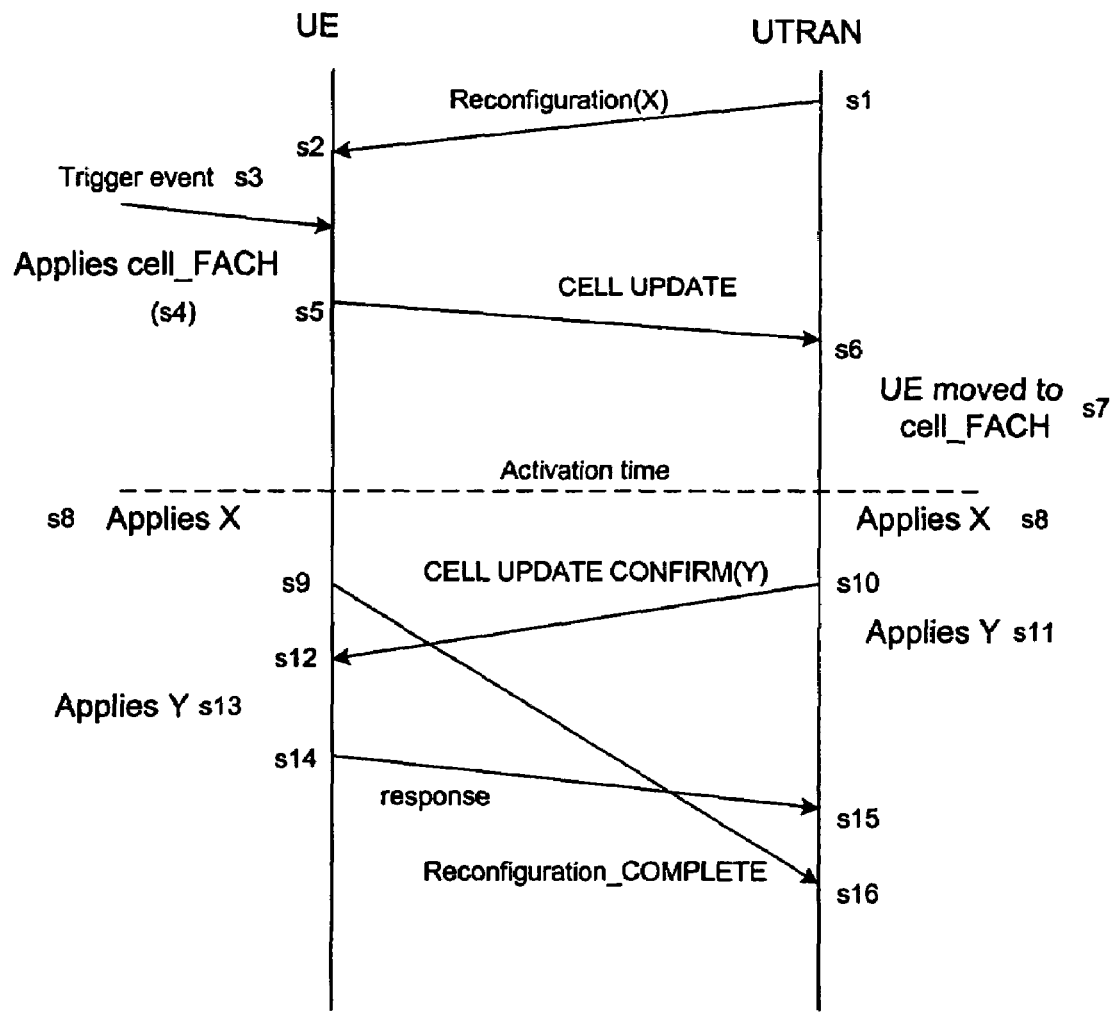
FIG. 6 is a message sequence chart illustrating the implementation of behaviour B0, in which the Cell Update and Reconfiguration procedures execute independently.

FIG. 6 is a message sequence chart illustrating the implementation of behaviour B0, in which the Cell Update and Reconfiguration procedures execute independently.

A Reconfiguration command is sent from the UTRAN to the UE with an activation time and new configuration X, for example a dedicated physical channel (step s1). This is received at the UE (step s2). A trigger event then occurs, for example radio link failure (step s3), and the UE responds by moving into the cell_FACH state (step s4) and sends a CELL UPDATE command to the UTRAN (step s5). The UTRAN receives the command (step s6) and notes that the UE has moved into the cell_FACH state (step s7). On the assumption that the activation time is then reached, the UE and UTRAN apply the new configuration X (step s8). The UE then sends a Reconfiguration_COMPLETE command (step s9), while the UTRAN sends a CELL UPDATE CONFIRM message with a new configuration Y (step s10) and applies configuration Y itself (step s11). The UE receives the CELL UPDATE CONFIRM message (step s12) and in response, the UE applies configuration Y (step s13) and sends a response to the UTRAN (step s14). The UTRAN receives the response confirming that the UE has applied configuration Y (step s15) and a short time later receives the Reconfiguration_COMPLETE message that confirms the UE has applied configuration X (step s16).

There are a number of problems with the above described behaviour B0. For example, it may not be possible to reach the activation time or the configuration X could involve the removal or modification of channels required to receive the CELL UPDATE CONFIRM command. In this latter case, if the activation time occurred in between the sending of the CELL UPDATE message (step s5) and reception of the CELL UPDATE CONFIRM message (step s12), an error would occur. Furthermore, if the activation time occurred as the CELL UPDATE CONFIRM message was in transit, then the UE would apply the configurations in the order X then Y, whilst the UTRAN would apply them in the opposite order, leading to a potential mismatch if the configurations X and Y clash.

Figure 7:
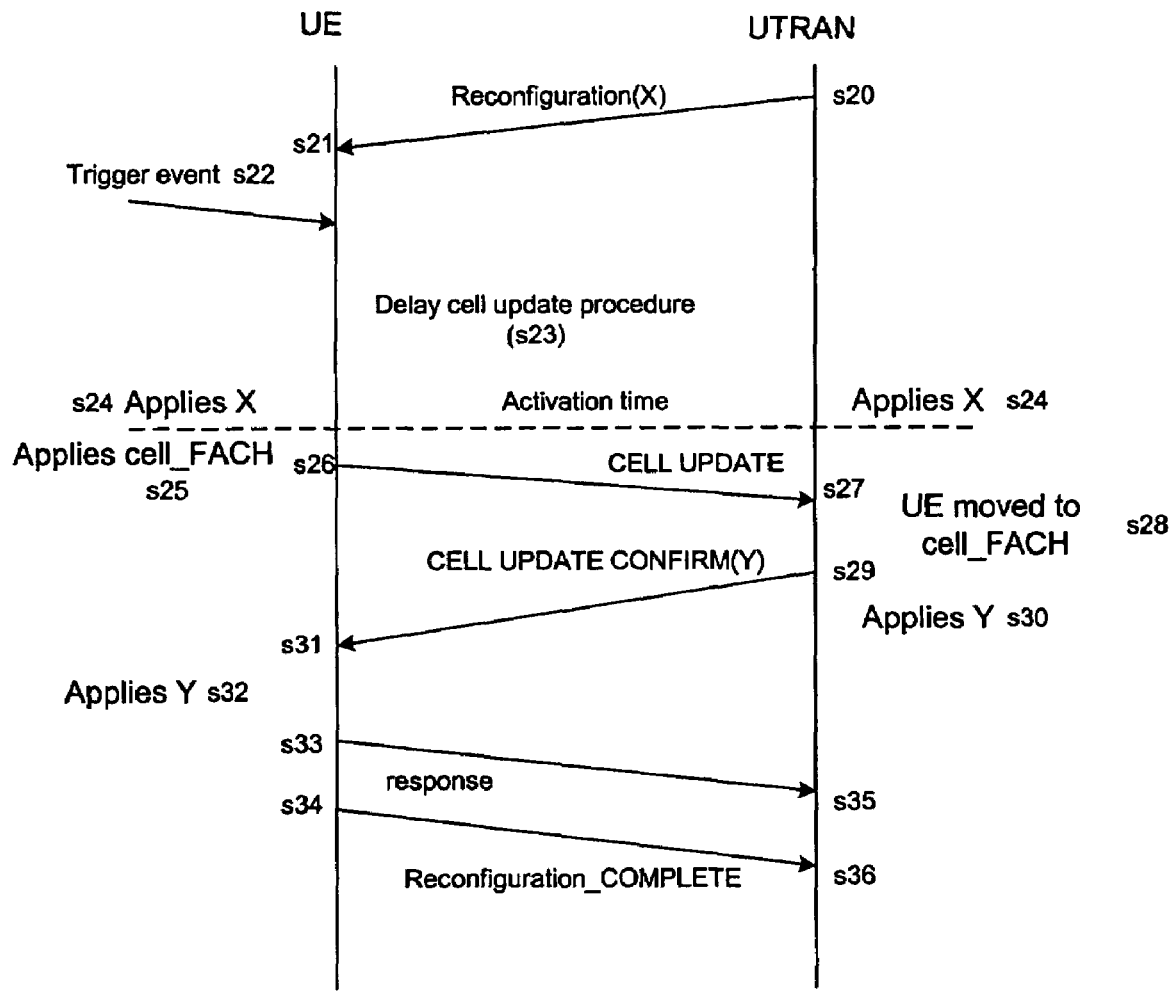
FIG. 7 is a message sequence chart illustrating the implementation of behaviour B1, in which the Cell Update procedure is delayed until the activation time of the reconfiguration has been reached and the new configuration applied.

FIG. 7 is a message sequence chart illustrating the implementation of behaviour B1, in which the Cell Update procedure is delayed until the activation time of the reconfiguration has been reached and the new configuration applied. The Reconfiguration command is sent from the UTRAN to the UE with an activation time and new configuration X (step s20). In the event that the activation time has the special value 'Now', the UE does not have to wait for synchronisation with the UTRAN, instead the activation time means as soon as possible. The Reconfiguration command is received at the UE (step s21). The trigger event then occurs, for example a radio link failure (step s22). In this case, the Cell Update procedure is held back until the activation time (step s23). When the activation time is reached, or immediately if 'Now' was specified, the UE and UTRAN apply the new configuration X (step s24).

To implement the delayed cell update procedure, the UE then moves to the cell_FACH state (step s25) and sends the CELL UPDATE command to the UTRAN (step s26). The UTRAN receives the command (step s27) and notes the UE has moved to the cell_FACH state (step s28). The UTRAN then sends the CELL UPDATE CONFIRM message with a new configuration Y (step s29) and applies configuration Y itself (step s30). The UE receives the CELL UPDATE CONFIRM message (step s31), applies configuration Y (step s32) and then sends a response to the UTRAN (step s33) and a Reconfiguration_COMPLETE message (step s34). The UTRAN receives the response confirming that the UE has applied configuration Y (step s35) and a short time later receives the Reconfiguration_COMPLETE message that confirms the UE had applied configuration X (step s36).

Apart from the delay to the start of the Cell Update procedure, this behaviour B1 can be considered to follow the current 3GPP standard. There is a disadvantage in that the cell update is delayed while the reconfiguration activates, which may increase the response time to trigger events. Also, it may not be possible to reach the activation time in some circumstances. However, it has the advantage that the configurations always occur in the order X+FACH+Y.

When working with a UE having behaviour B1, the UTRAN applies the following rules. If it receives a CELL UPDATE message without first having reached the activation time for a pending reconfiguration, it should not apply the reconfiguration at activation time, but should wait until after the Cell Update procedure completes. This rule copes with the case where the Reconfiguration command crosses with the Cell Update command. If, after sending a Reconfiguration command, the UTRAN either times out waiting for a reply or receives a Reconfiguration_FAILURE message, it should revert to the previous configuration and then resend the Reconfiguration command.

Figure 4:
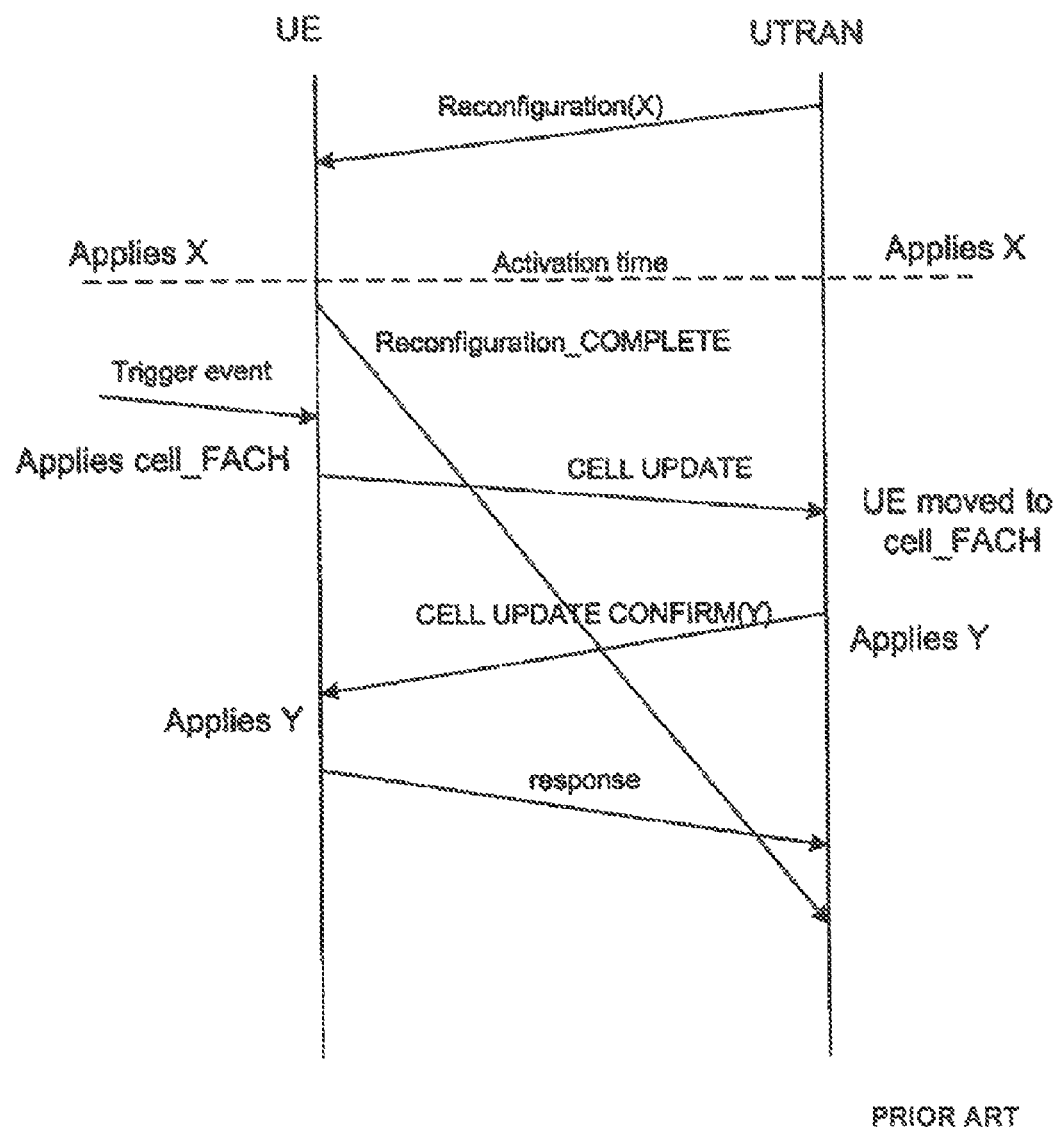
FIG. 4 illustrates the situation of a cell update occurring while the Reconfiguration_COMPLETE message is in transit.

Since behaviour B1 effectively pretends that the Cell Update procedure was not triggered until just after the activation time, UEs operating according to this behaviour will interoperate with any UTRAN which can cope with the scenario illustrated in FIG. 4.

Figure 8:
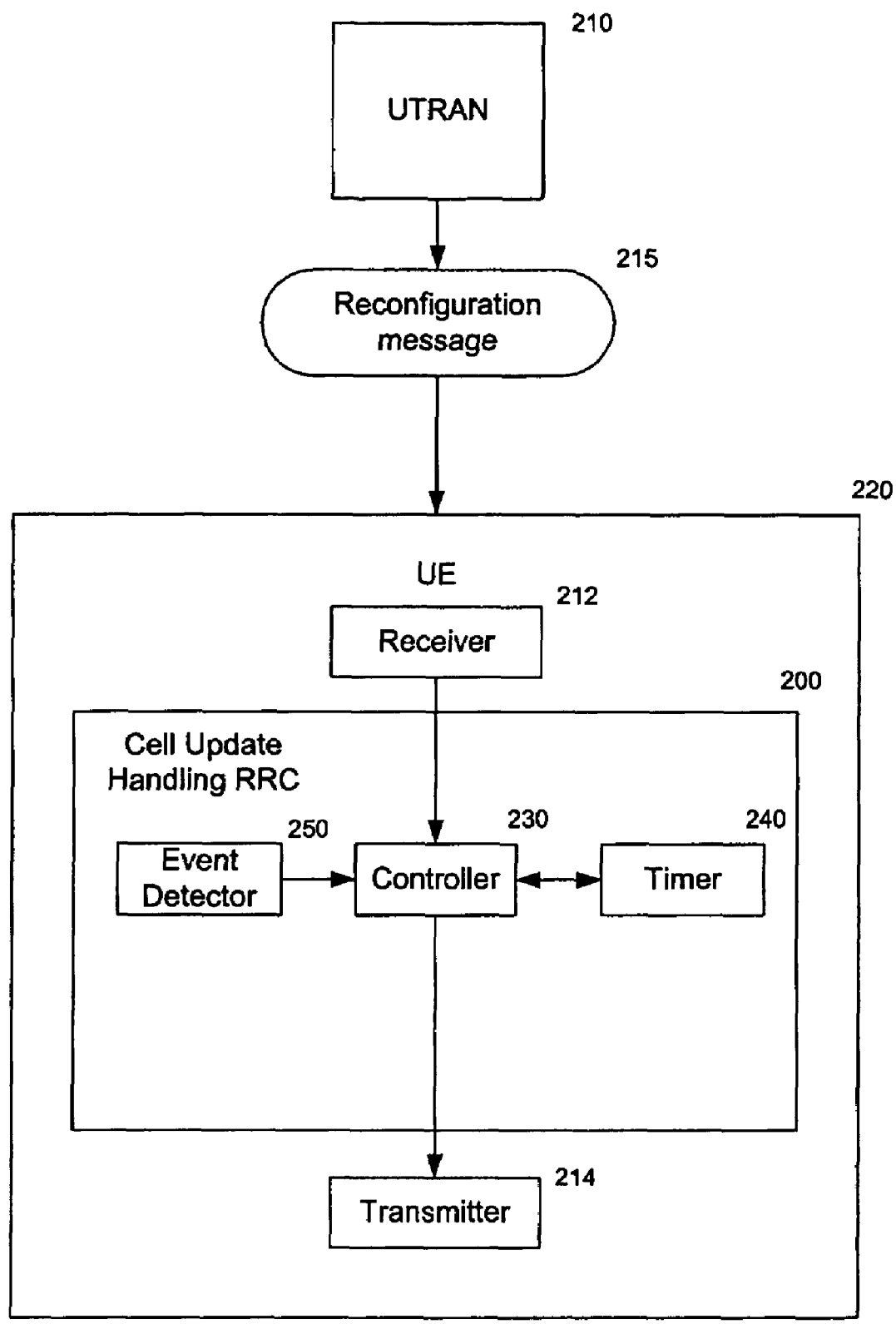
FIG. 8 is a block diagram illustrating in greater detail the Cell Update Handling RRC block shown in FIG. 5 for implementing behaviour B1.

FIG. 8 is a block diagram illustrating in greater detail the Cell Update Handling RRC block shown in FIG. 5 for implementing behaviour B1.

UTRAN 210 sends an RRC Reconfiguration message 215 to a UE 220. UE 220 is provided with a receiver 212 to receive the message and a transmitter 214 to send an appropriate response. UE 220 is also provided with a Cell Update Handling RRC block 200, which is connected to receive messages from UTRAN 210 via the receiver 212 and to transmit messages to the UTRAN 210 via the transmitter 214. The connections between the receiver 212 and the transmitter 214 may involve blocks that are not expressly shown in FIG. 8, such as the protocol stack blocks of FIG. 5.

The CUH RRC block 200 includes a controller 230, a timer unit 240 and an event detector 250, the operation of which is explained in more detail with reference to FIG. 9.

Figure 9:
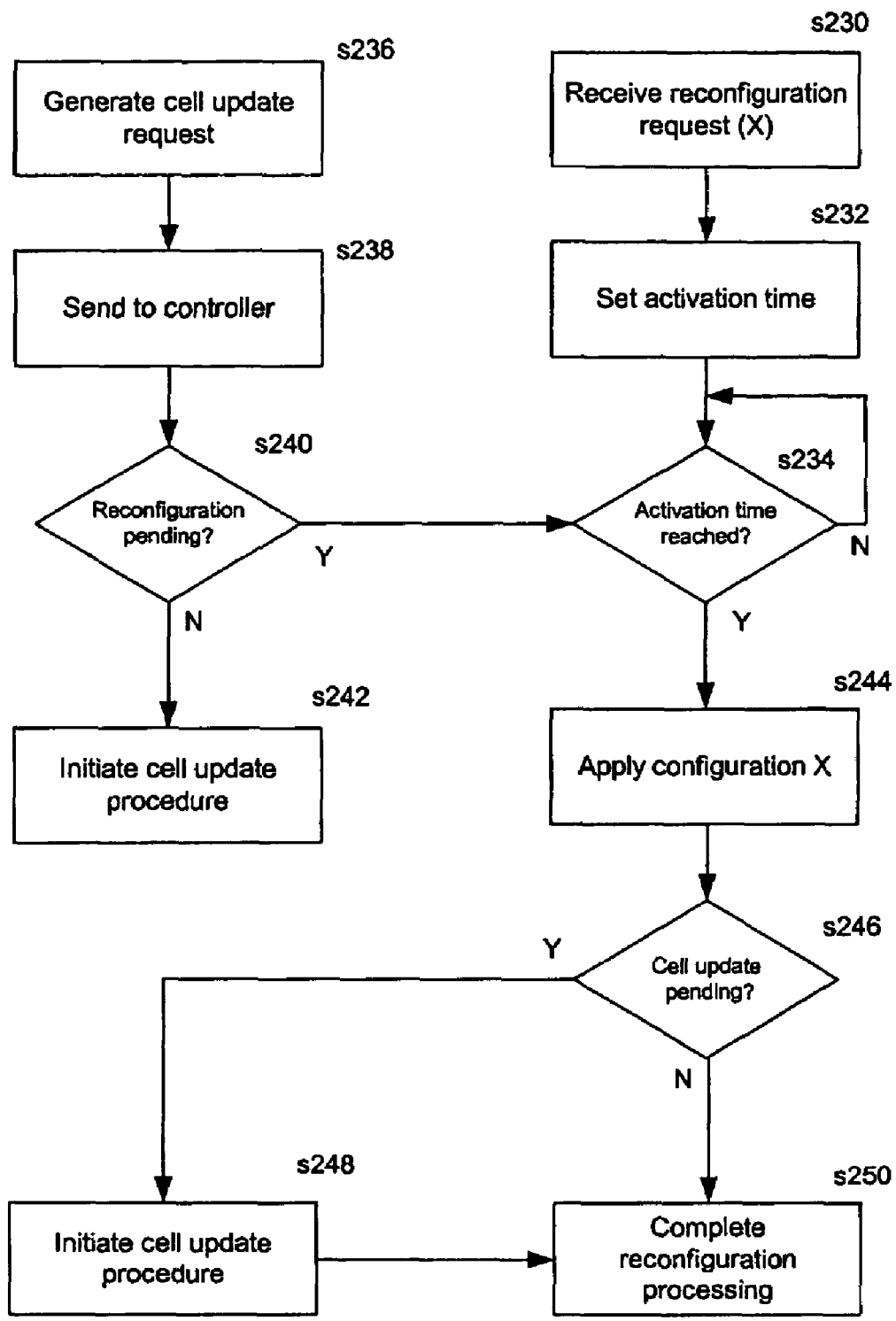
FIG. 9 is a flow diagram illustrating the implementation of behaviour B1 in the CUH RRC block 200 shown in FIG. 8.

FIG. 9 is a flow diagram illustrating the implementation of behaviour B1 in the CUH RRC block 200.

Referring to FIG. 9, the controller 230 receives the Reconfiguration command via the receiver 212 (step s230)

and sets the required activation time at the timer unit 240 (step s232). The timer unit 240 receives synchronisation signals from the UTRAN to enable it to determine when the activation time has been reached (step s234). In the meantime, the event detector 250 detects a trigger event and generates a cell update request (step s236) and sends it to the controller (step s238). The controller 230 determines whether a reconfiguration is pending (step s240). If so, it waits until the activation time has been reached (step s234). Otherwise, it proceeds with the cell update procedure as normal (step s242). On reaching the activation time, or as soon as possible if the activation time was specified as 'Now', the controller applies configuration X (step s244) and determines whether a cell update is pending (step s246). If it is, it initiates the cell update procedure (step s248) and then completes the reconfiguration processing (step s250). If a cell update is not pending (step s246), the controller 230 proceeds to complete the reconfiguration processing step (step s250).

Figure 10:
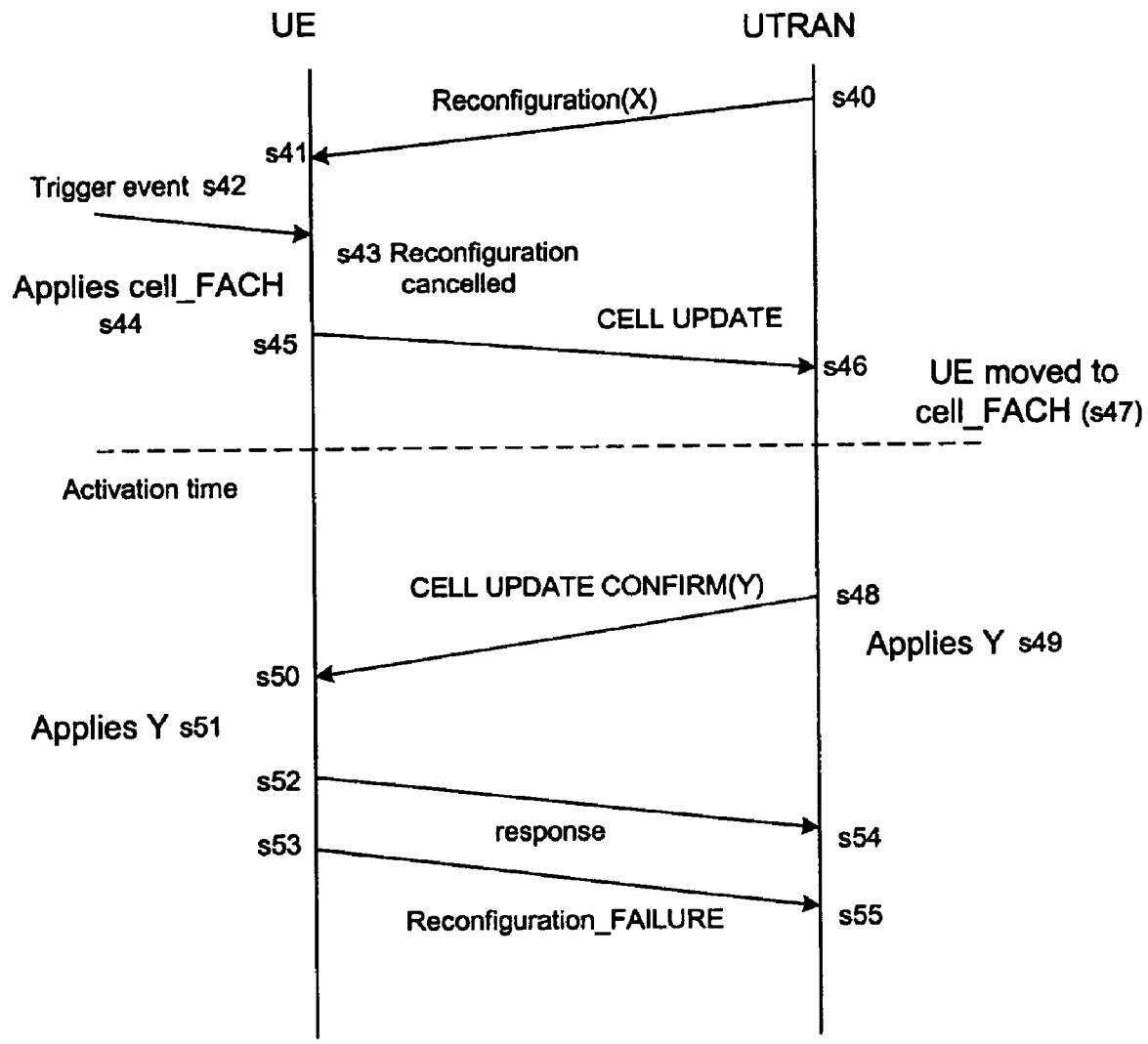
FIG. 10 is a message sequence chart illustrating the implementation of behaviour B2, in which the reconfiguration is cancelled as soon as the Cell Update procedure starts.

FIG. 10 is a message sequence chart illustrating the implementation of behaviour B2, in which the reconfiguration is cancelled as soon as the Cell Update procedure starts.

In this example, the Reconfiguration command is sent from the UTRAN to the UE with an activation time and new configuration X (step s40). This is received at the UE (step s41). The trigger event then occurs (step s42) which initiates the Cell Update procedure and the active reconfiguration is cancelled (step 43). As in the case of behaviour B0, the UE then moves into the cell_FACH state (step s44) and sends the CELL UPDATE command to the UTRAN (step s45). The UTRAN receives the CELL UPDATE command (step s46) and notes the UE has moved into the cell_FACH state (step s47). The UTRAN then sends the CELL UPDATE CONFIRM message with a new configuration Y (step s48) and applies configuration Y itself (step s49). The UE receives the CELL UPDATE CONFIRM message (step s50), applies configuration Y (step s51) and then sends a response to the UTRAN (step s52) and a Reconfiguration_ FAILURE message (step s53). The UTRAN receives the response confirming that the UE has applied configuration Y (step s54) and a short time later receives the Reconfiguration_FAILURE message that application of configuration X was cancelled (step s55). As is evident from the above description, since the reconfiguration has been cancelled, the activation time is irrelevant in this example.

Figure 1:
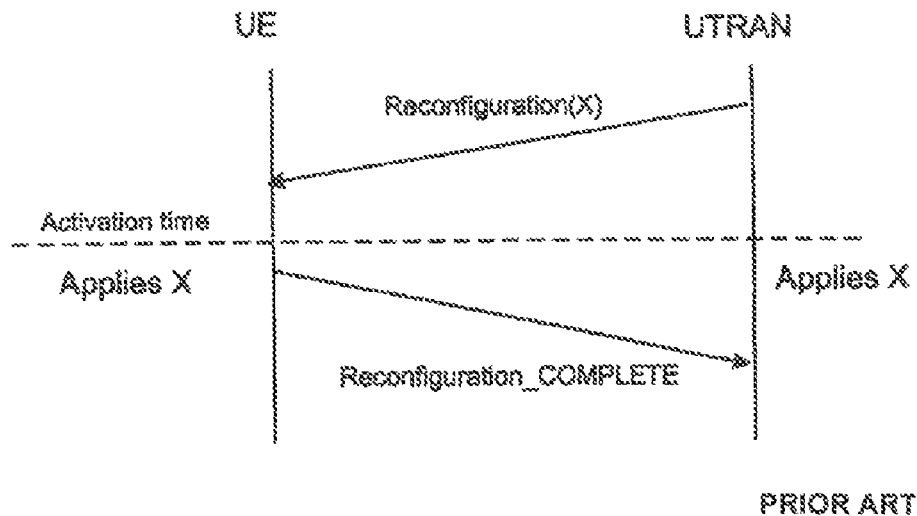
FIG. 1 illustrates a reconfiguration procedure in a UMTS system.
Figure 2:
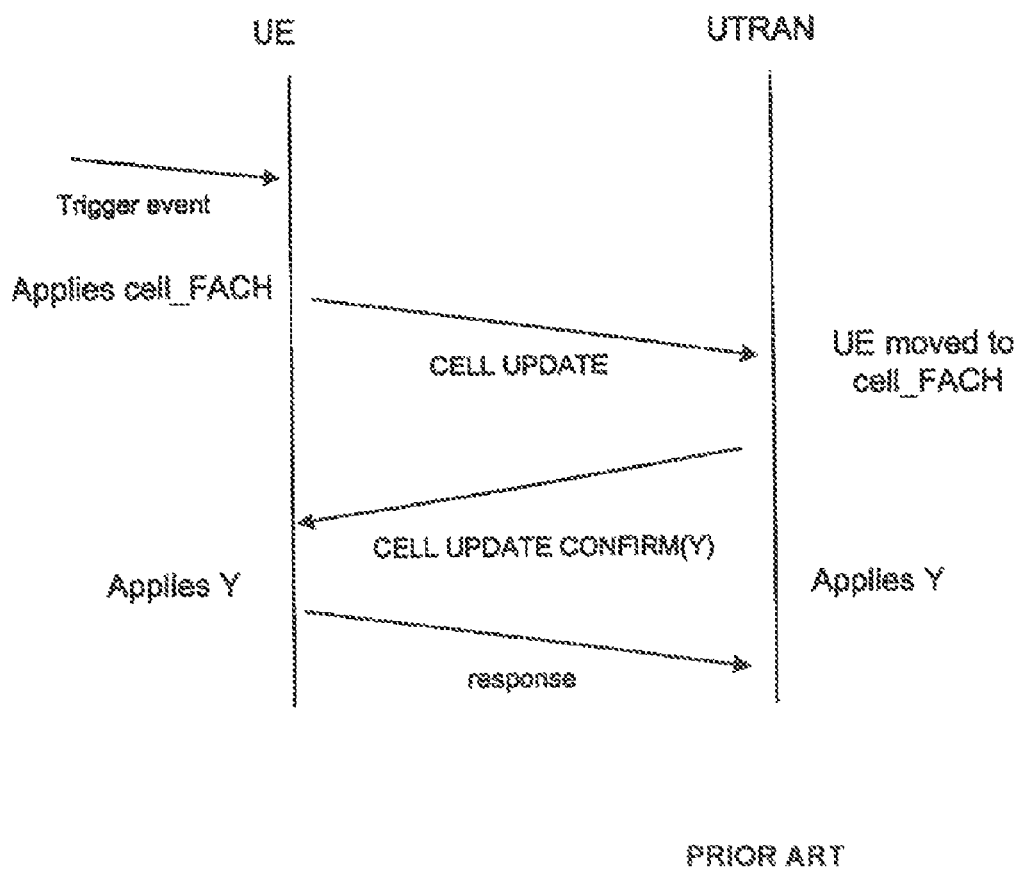
FIG. 2 illustrates a cell update procedure in a UMTS system.
Figure 3:
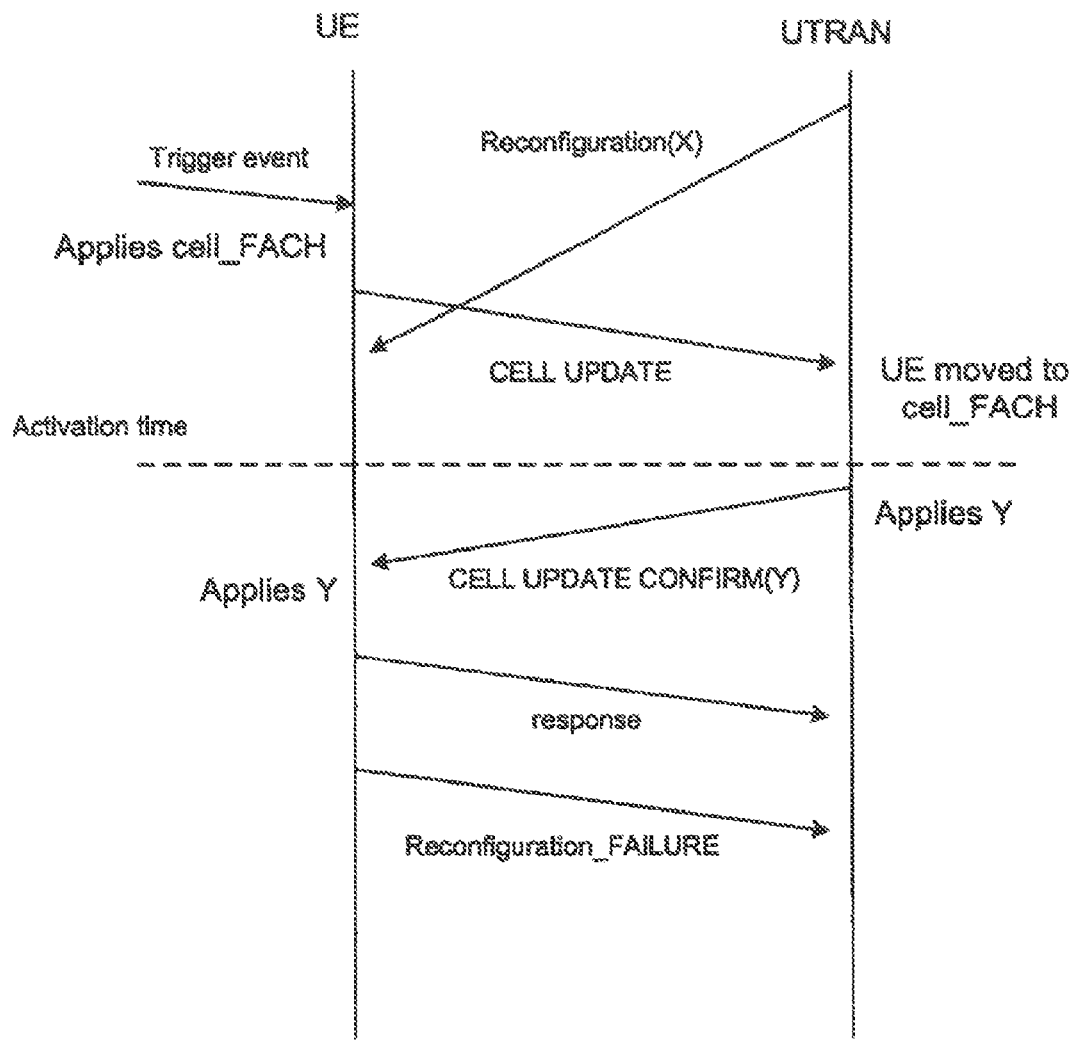
FIG. 3 illustrates the situation where a Reconfiguration command is issued by the UTRAN but reaches the UE after the UE has sent the CELL UPDATE command to the UTRAN.

The disadvantage of this behaviour is that the UTRAN may have to apply a further reconfiguration, if it decides that the original reconfiguration still applies after the Cell Update procedure has finished. Because behaviour B2 effectively pretends that a cell update trigger occurred just before the Reconfiguration command was received, UEs configured according to B2 will interoperate with any UTRAN that can cope with the scenario illustrated in FIG. 3.

Figure 11:
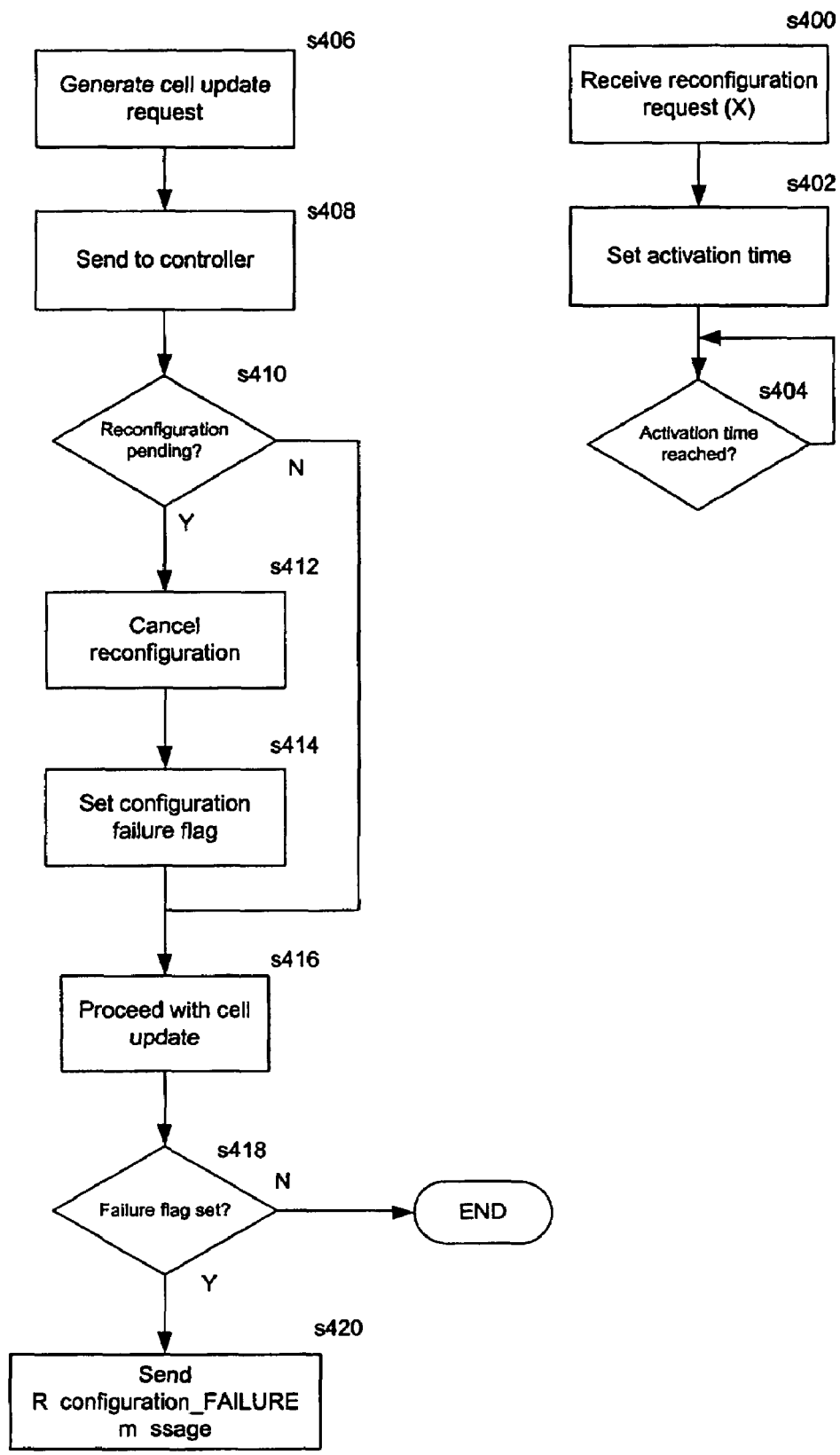
FIG. 11 is a flow diagram illustrating the implementation of behaviour B2 in the CUH RRC block 200 shown in FIG. 8.

FIG. 11 is a flow diagram illustrating the implementation of behaviour B2 in the CUH RRC block 200 shown in FIG. 8.

Referring to FIG. 11, the controller 230 receives the Reconfiguration command via the receiver 212 (step s400) and sets the required activation time at the timer unit 240 (step s402). The timer unit 240 receives synchronisation signals from the UTRAN to enable it to determine when the activation time has been reached (step s404). In the meantime, the event detector 250 detects a trigger event and generates a cell update request (step s406) and sends it to the controller (step s408). The controller 230 determines whether a reconfiguration is pending (step s410). If a reconfiguration is pending, it is cancelled (step s412) and a configuration failure flag set to allow for transmission of a Reconfiguration_FAILURE message at the appropriate time (step s414). The cell update procedure is then continued (step s416). If no reconfiguration is pending, the controller 230 proceeds with the cell update procedure as normal (step s416). Once the cell update procedure is completed and if the configuration failure flag is set (step s418), the UE transmits a Reconfiguration_FAILURE message to the UTRAN to enable it to take appropriate action (step s420).

Figure 12:
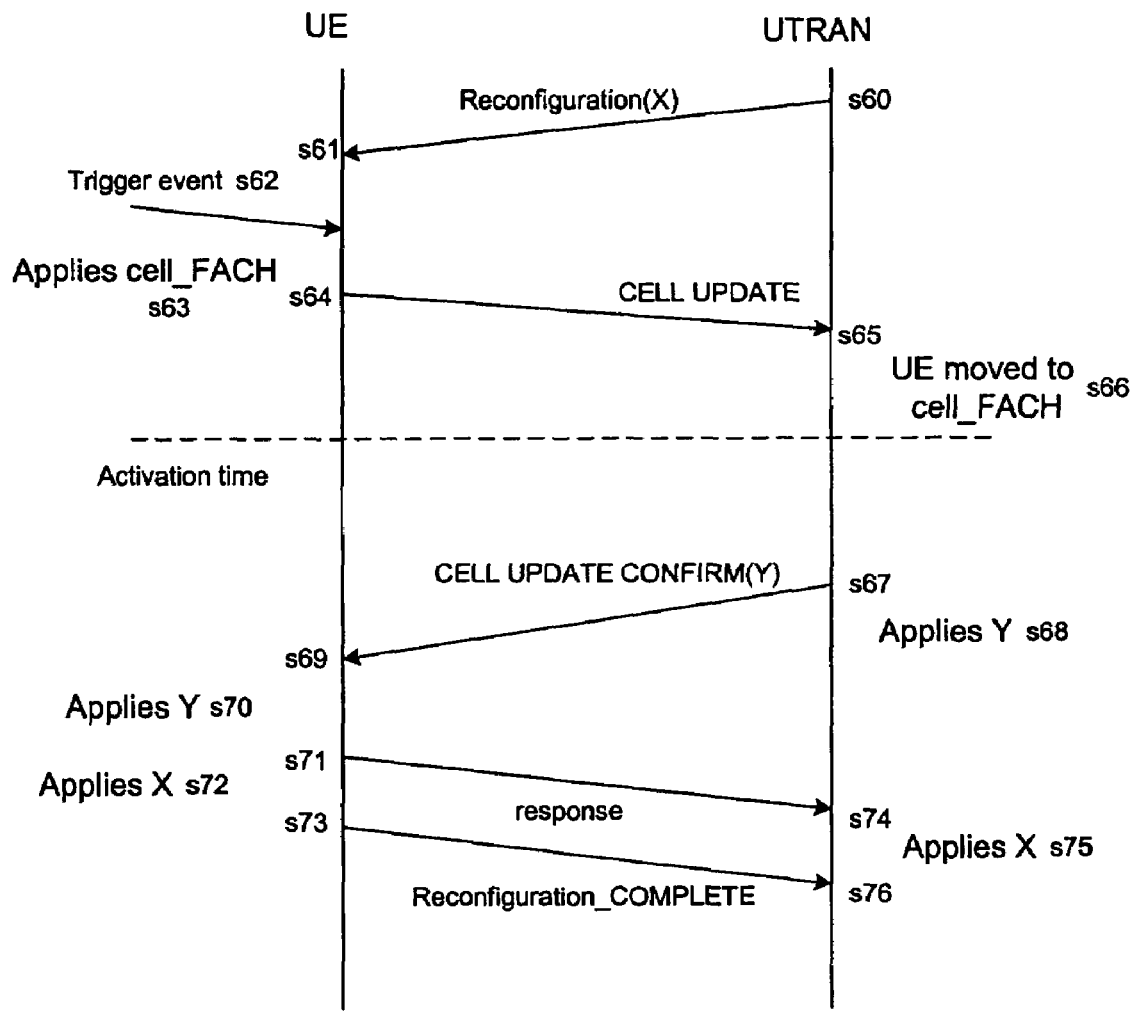
FIG. 12 is a message sequence chart illustrating the implementation of behaviour B3, in which the reconfiguration is delayed until after the Cell Update procedure completes.

FIG. 12 is a message sequence chart illustrating the implementation of behaviour B3, in which the reconfiguration is delayed until after the Cell Update procedure completes.

In this example, the Reconfiguration command is sent from the UTRAN to the UE with an activation time and new configuration X (step s60). This is received at the UE (step s61). The trigger event then occurs (step s62). As in the case of behaviour B2, the UE then moves into the cell_FACH state (step s63) and sends the CELL UPDATE command to the UTRAN (step s64). The UTRAN receives the CELL UPDATE command (step s65) and notes the UE has moved into the cell_FACH state (step s66). When the activation time is reached, nothing occurs, since the reconfiguration is held back until the Cell Update procedure completes. The UTRAN then sends the CELL UPDATE CONFIRM message with a new configuration Y (step s67) and applies configuration Y itself (step s68). The UE receives the CELL UPDATE CONFIRM message (step s69), applies configuration Y (step s70) and then sends a response to the UTRAN (step s71). At this point it completes the reconfiguration, applies configuration X (step s72) and sends a Reconfiguration_COMPLETE message (step s73). The UTRAN receives the response confirming that the UE has applied configuration Y (step s74), applies configuration X (step s75) and receives the Reconfiguration_COMPLETE message (step s76).

This behaviour suffers from a flaw in the event that the activation time happens to occur while the CELL UPDATE is in transit. In that case, the UTRAN will apply the reconfiguration X since it does not yet know about the Cell Update. However, the UE will not apply the reconfiguration X until after the Cell Update completes. Thus the UE is left with a configuration of FACH+Y+X, while the UTRAN assumes a configuration of X+FACH+Y.

Figure 13:
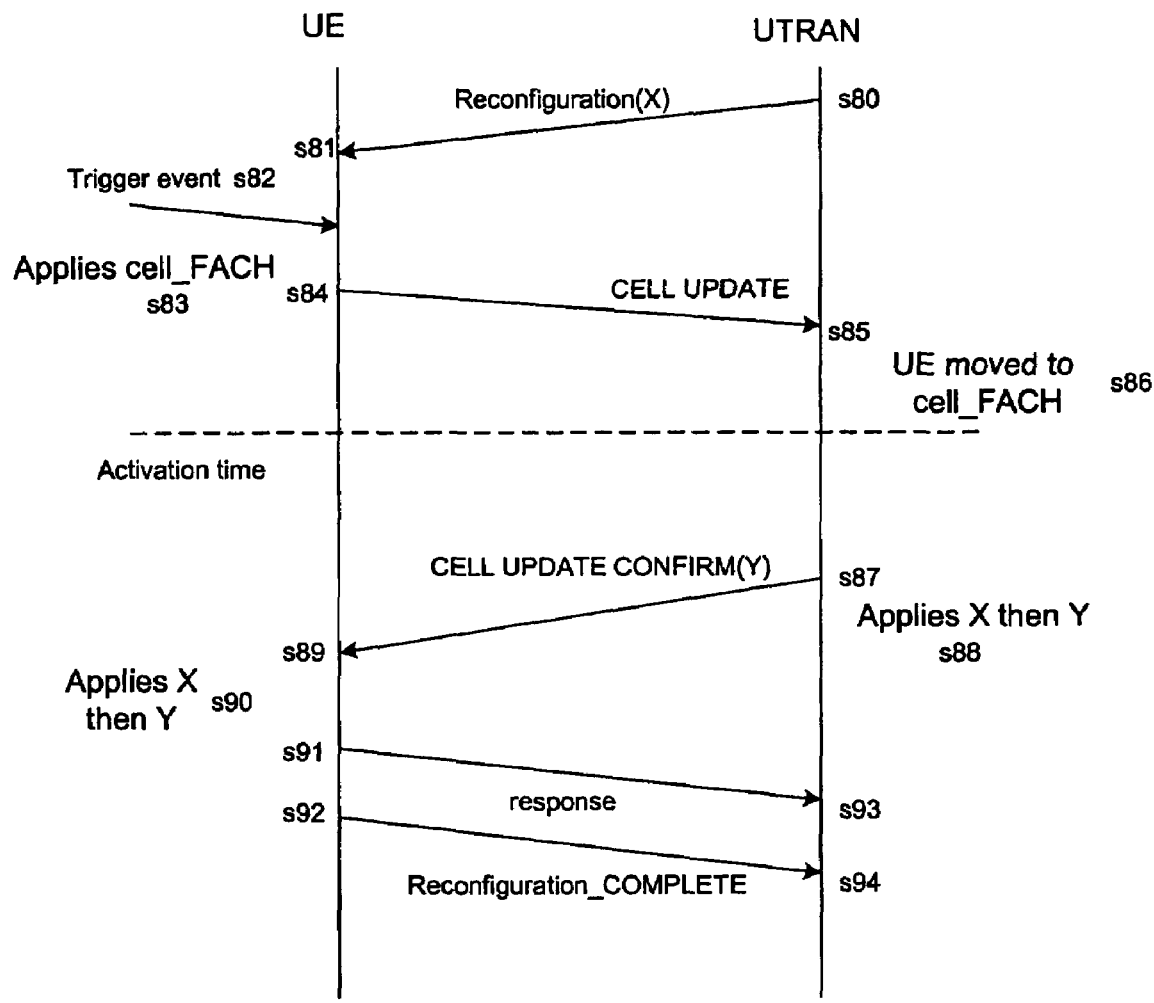
FIG. 13 is a message sequence chart illustrating the implementation of behaviour B4, in which the reconfiguration is delayed until the CELL UPDATE CONFIRM message is received.

FIG. 13 is a message sequence chart illustrating the implementation of behaviour B4, in which the reconfiguration is delayed until the CELL UPDATE CONFIRM message is received.

In this example, the Reconfiguration command is sent from the UTRAN to the UE with an activation time and new configuration X (step s80). This is received at the UE (step s81). The trigger event then occurs (step s82). As in the case of behaviour B2, the UE then moves into the cell_FACH state (step s83) and sends the CELL UPDATE command to the UTRAN (step s84). The UTRAN receives the CELL UPDATE command (step s85) and notes the UE has moved into the cell_FACH state (step s86). When the activation time is reached, nothing occurs, since the reconfiguration is held back until the CELL UPDATE CONFIRM message is received by the UE. The UTRAN sends the CELL UPDATE CONFIRM message with a new configuration Y (step s87) and applies configuration X and then configuration Y (step s88). The UE receives the CELL UPDATE CONFIRM (Y) message (step s89), applies configuration X and then Y (step s90) and then sends a response to the UTRAN (step s91). It also sends a Reconfiguration_COMPLETE message to the UTRAN (step s92). The UTRAN receives the response (step s93) and the Reconfiguration_COMPLETE message (step s94).

A flaw in B4 is that if the activation time occurs while the CELL UPDATE message is in transit, then the UTRAN performs the reconfiguration at the activation time, but the UE will not perform the reconfiguration until it receives the CELL UPDATE CONFIRM message. This means that the UE is left with FACH+X+Y whereas the UTRAN assumes a X+FACH+Y configuration. This results in an undetectable mismatch in configurations.

Figure 14:
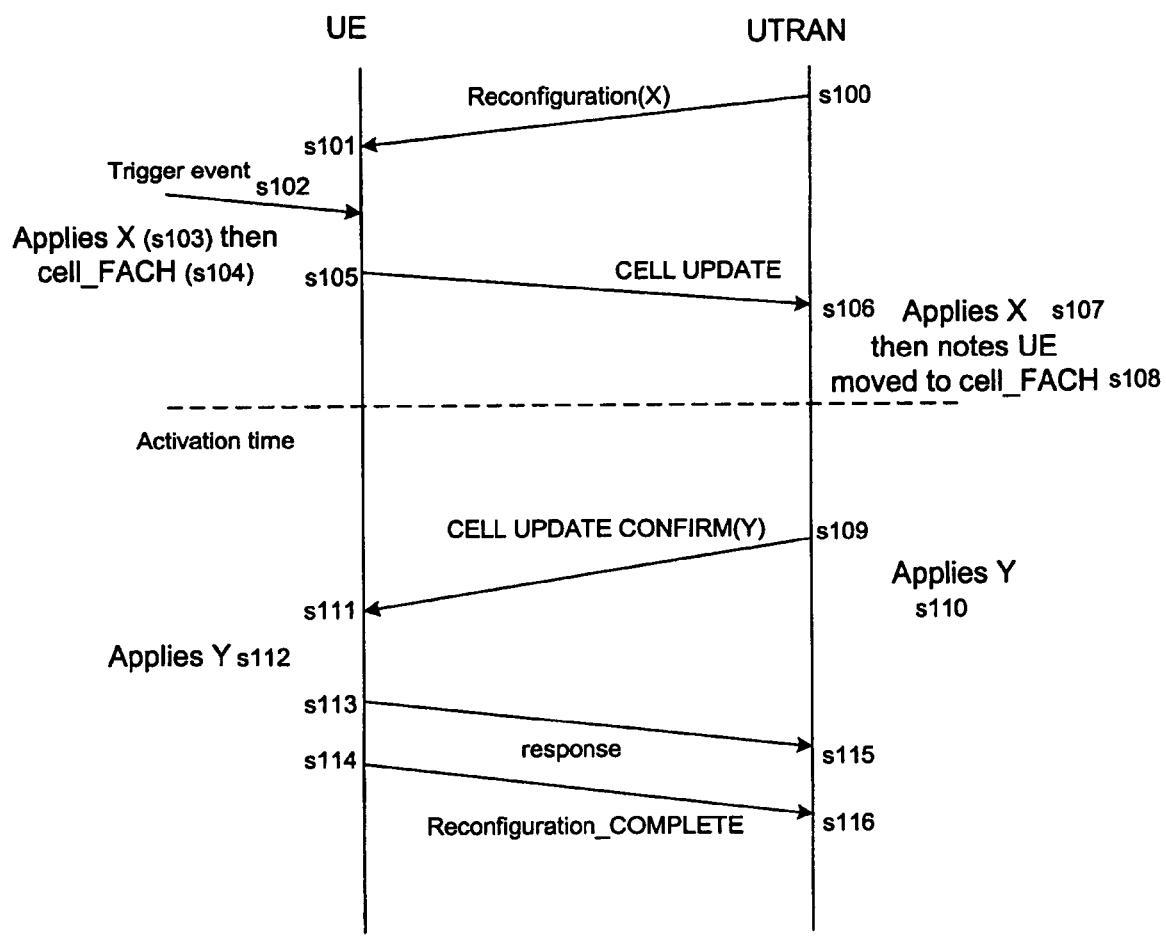
FIG. 14 is a message sequence chart illustrating the implementation of behaviour B5, in which pending reconfigurations are executed immediately, irrespective of their activation times.

FIG. 14 is a message sequence chart illustrating the implementation of behaviour B5, in which pending reconfigurations are executed immediately, irrespective of their activation times.

In this example, the Reconfiguration command is sent from the UTRAN to the UE with an activation time and new configuration X (step s100). This is received at the UE (step s101). The trigger event then occurs (step s102). The UE then applies the new configuration X (step s103), moves into the cell_FACH state (step s104) and sends the CELL UPDATE command to the UTRAN (step s105). The UTRAN receives the CELL UPDATE command (step s106), applies the new configuration X (step s107) and notes the UE has moved into the cell_FACH state (step s108). When the activation time is reached, nothing occurs, since the reconfiguration has been brought forward to the moment that the Cell Update procedure starts, as described above. The UTRAN then sends the CELL UPDATE CONFIRM message with a new configuration Y (step s109) and applies configuration Y (step s110). The UE receives the CELL UPDATE CONFIRM (Y) message (step s111), applies configuration Y (step s112) and then sends a response to the UTRAN (step s113). It also sends a Reconfiguration_COMPLETE message to the UTRAN (step s114). The UTRAN receives the response (step s15) and the Reconfiguration_ COMPLETE message (step s116).

This behaviour has the advantage that the configurations are always applied in the order X+FACH+Y. However, a flaw in behaviour B5 occurs if the reconfiguration command takes such a long time to transmit that it arrives after the CELL UPDATE CONFIRM message. In this case, the UE will apply the configuration in the CELL UPDATE CONFIRM message before that of the reconfiguration, resulting in a configuration of FACH+Y+X. The UTRAN will apply the reconfiguration first, resulting in X+FACH+Y, which may result in an undetectable mismatch. A further disadvantage of this behaviour is that it will not interoperate with a UTRAN expecting behaviours B1, B2 or B3.

Figure 15:
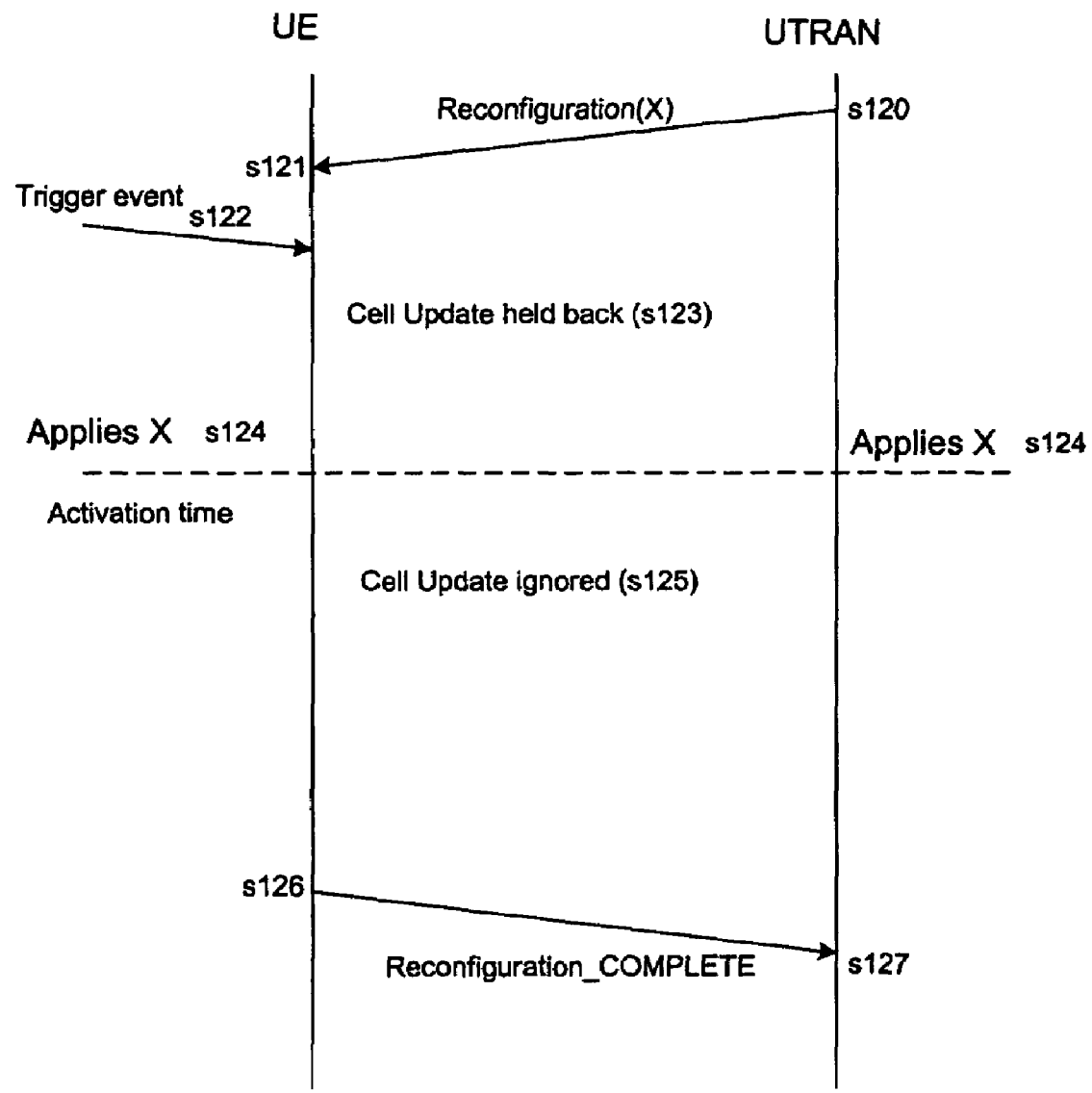
FIG. 15 is a message sequence chart illustrating the implementation of behaviour B6, which is a variation of behaviour B1 in which the cell update may be suppressed in certain circumstances.

FIG. 15 is a message sequence chart illustrating the implementation of behaviour B6, which is a variation of behaviour B1 in which the cell update may be suppressed in certain circumstances.

In this example, the Reconfiguration command is sent from the UTRAN to the UE with an activation time and new configuration X (step s120). This is received at the UE (step s121). The trigger event then occurs, for example a radio link failure (step s122). The Cell Update procedure is held back as in behaviour B1 (step s123). When the activation time is reached, the UE and UTRAN apply the new configuration X (step s124). Now if the reason for the cell update has been removed by the reconfiguration, for example, the failed radio link has been removed, the cell update is simply ignored (sl25) and the reconfiguration procedure completes by transmission of the Reconfiguration_COMPLETE message to the UTRAN (step s126).

Finally, the UTRAN receives the Reconfiguration_COMPLETE message confirming that the UE has applied configuration X (step s127).

If the reason for the cell update is still pertinent, then behaviour B1 is used, that is a cell update is performed and a Reconfiguration_FAILURE message sent to the UTRAN (see FIG. 7, steps s26-s36).

Figure 16:
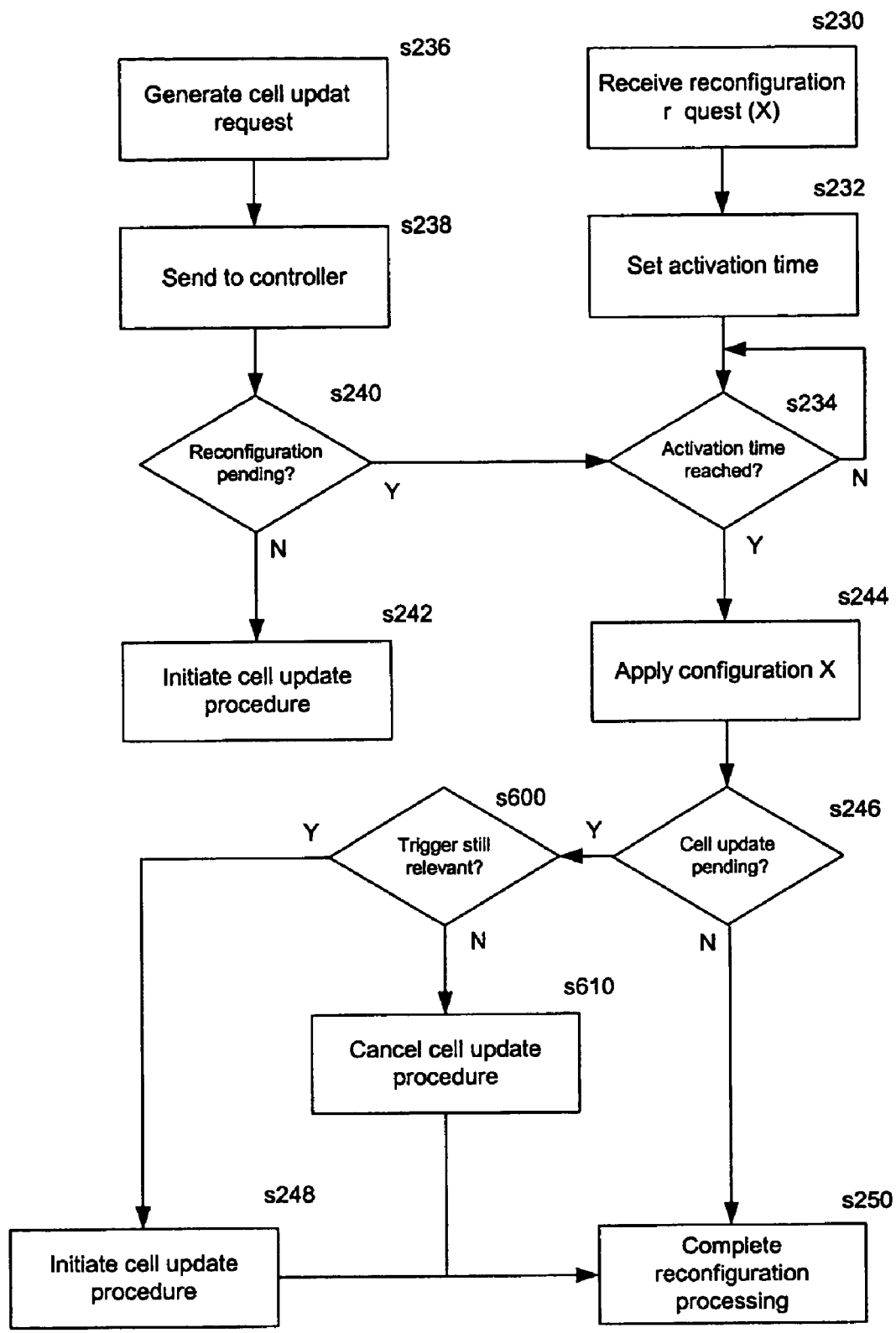
FIG. 16 is a flow diagram illustrating the implementation of behaviour B6 in the CUH RRC block 200.

FIG. 16 is a flow diagram illustrating the implementation of behaviour B6 in the CUH RRC block 200.

FIG. 16 is a modification of the flow diagram shown in FIG. 9 and steps s230 to s244 will not be described again. At step s246, the controller 230 determines whether a cell update is pending. If it is, the controller 230 then determines whether the trigger event, which generated the cell update request, is still relevant, that is, if the UTRAN still needs to be informed (step s600). If so, then the cell update is proceeded with (step s248). However, if the trigger event is no longer relevant (step s600), the controller cancels the Cell Update procedure (step s610) and then completes the reconfiguration processing (step s250).

Figure 17:
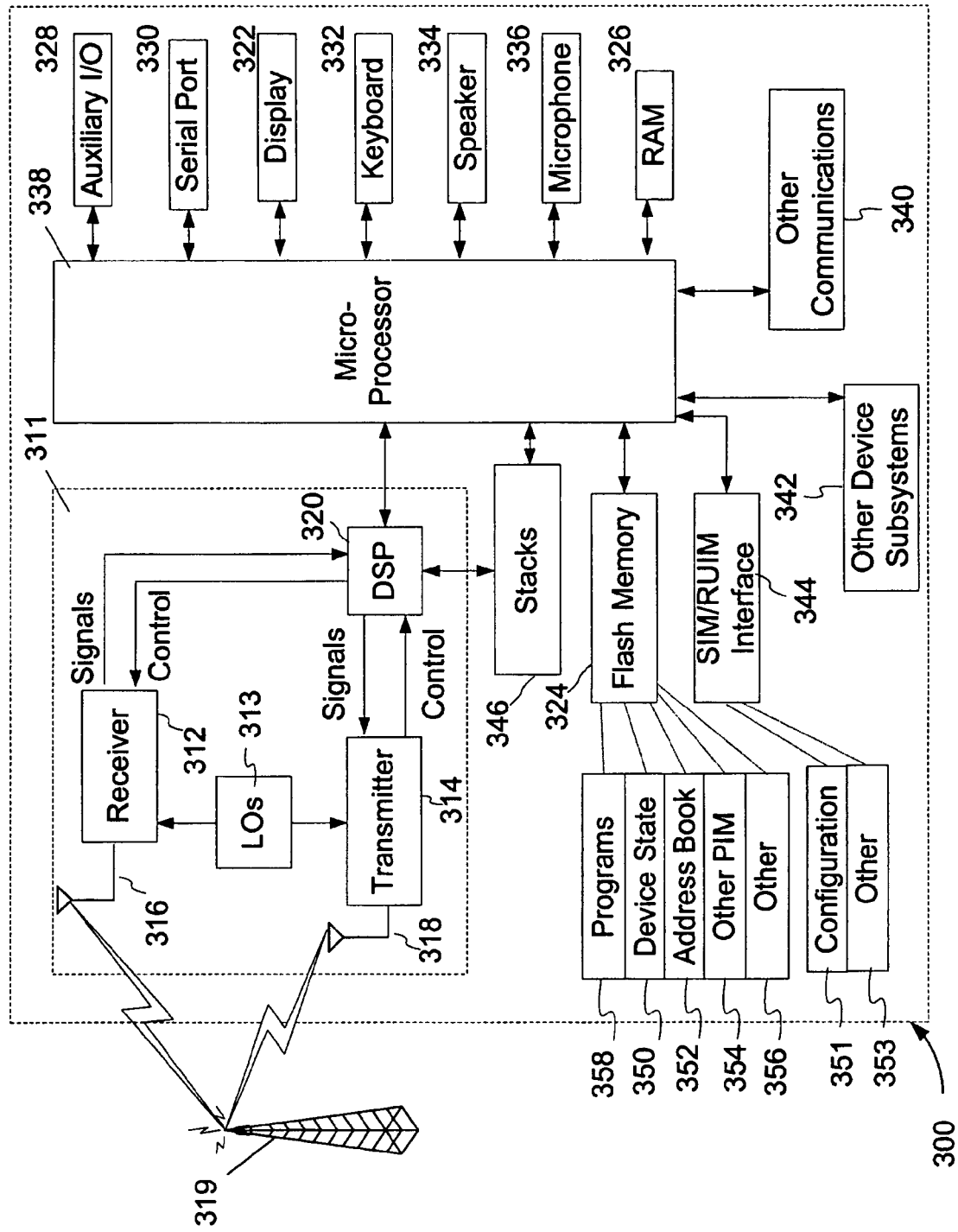
FIG. 17 is a block diagram illustrating a mobile device, which can act as a UE and co-operate with the apparatus and methods of FIGS. 1 to 16.

Turning now to FIG. 17, FIG. 17 is a block diagram illustrating a mobile device, which can act as a UE and co-operate with the apparatus and methods of FIGS. 1 to 16, and which is an exemplary wireless communication device. Mobile station 300 is preferably a two-way wireless communication device having at least voice and data communication capabilities. Mobile station 300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 300 is enabled for two-way communication, it will incorporate a communication subsystem 311, including both a receiver 312 and a transmitter 314, as well as associated components such as one or more, preferably embedded or internal, antenna elements 316 and 318, local oscillators (LOs) 313, and a processing module such as a digital signal processor (DSP) 320. As will be apparent to those skilled in the field of communications, the particular design of the communication subsystem 311 will be dependent upon the communication network in which the device is intended to operate. For example, mobile station 300 may include a communication subsystem 311 designed to operate within the Mobitex™ mobile communication system, the DataTAC™ mobile communication system, GPRS network, UMTS network, EDGE network.

Network access requirements will also vary depending upon the type of network 319. For example, in the Mobitex and DataTAC networks, mobile station 300 is registered on the network using a unique identification number associated with each mobile station. In UMTS and GPRS networks, however, network access is associated with a subscriber or user of mobile station 300. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 300 will be unable to carry out any other functions involving communications over the network 300. The SIM interface 344 is normally similar to a card-slot into which a SIM card can be inserted and ejected like a diskette or PCMCIA card. The SIM card can have approximately 64K of memory and hold many key configuration 351, and other information 353 such as identification, and subscriber related information.

When required network registration or activation procedures have been completed, mobile station 300 may send and receive communication signals over the network 319. Signals received by antenna 316 through communication network 319 are input to receiver 312, which may perform such common receiver functions as signal amplification, frequency down conversion, filtering, channel selection and the like, and in the example system shown in FIG. 17, analog to digital (A/D) conversion. A/D conversion of a received signal allows more complex communication functions such as demodulation and decoding to be performed in the DSP 320. In a similar manner, signals to be transmitted are processed, including modulation and encoding for example, by DSP 320 and input to transmitter 314 for digital to analog conversion, frequency up conversion, filtering, amplification and transmission over the communication network 319 via antenna 318. DSP 320 not only processes communication signals, but also provides for receiver and transmitter control. For example, the gains applied to communication signals in receiver 312 and transmitter 314 may be adaptively controlled through automatic gain control algorithms implemented in DSP 320.

Mobile station 300 preferably includes a microprocessor 338 which controls the overall operation of the device. Communication functions, including at least data and voice communications, are performed through communication subsystem 311. Microprocessor 338 also interacts with further device subsystems such as the display 322, flash memory 324, random access memory (RAM) 326, auxiliary input/output (I/O) subsystems 328, serial port 330, keyboard 332, speaker 334, microphone 336, a short-range communications subsystem 340 and any other device subsystems generally designated as 342.

Some of the subsystems shown in FIG. 17 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list.

Operating system software used by the microprocessor 338 is preferably stored in a persistent store such as flash memory 324, which may instead be a read-only memory (ROM) or similar storage element (not shown). Those skilled in the art will appreciate that the operating system, specific device applications, or parts thereof, may be temporarily loaded into a volatile memory such as RAM 326. Received communication signals may also be stored in RAM 326.

As shown, flash memory 324 can be segregated into different areas for both computer programs 358 and program data storage 350, 352, 354 and 356. These different storage types indicate that each program can allocate a portion of flash memory 324 for their own data storage requirements. Microprocessor 338, in addition to its operating system functions, preferably enables execution of software applications on the mobile station. A predetermined set of applications that control basic operations, including at least data and voice communication applications for example, will normally be installed on mobile station 300 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 319. In a preferred embodiment, the PIM data items are seamlessly integrated, synchronized and updated, via the wireless network 319, with the mobile station user's corresponding data items stored or associated with a host computer system. Further applications may also be loaded onto the mobile station 300 through the network 319, an auxiliary I/O subsystem 328, serial port 330, short-range communications subsystem 340 or any other suitable subsystem 342, and installed by a user in the RAM 326 or preferably a non-volatile store (not shown) for execution by the microprocessor 338. Such flexibility in application installation increases the functionality of the device and may provide enhanced on-device functions, communication-related functions, or both. For example, secure communication applications may enable electronic commerce functions and other such financial transactions to be performed using the mobile station 300.

In a data communication mode, a received signal such as a text message or web page download will be processed by the communication subsystem 311 and input to the microprocessor 338, which preferably further processes the received signal for output to the display 322, or alternatively to an auxiliary I/O device 328. A user of mobile station 300 may also compose data items such as email messages for example, using the keyboard 332, which is preferably a complete alphanumeric keyboard or telephone-type keypad, in conjunction with the display 322 and possibly an auxiliary I/O device 328. Such composed items may then be transmitted over a communication network through the communication subsystem 311.

For voice communications, overall operation of mobile station 300 is similar, except that received signals would preferably be output to a speaker 334 and signals for transmission would be generated by a microphone 336. Alternative voice or audio I/O subsystems, such as a voice message recording subsystem, may also be implemented on mobile station 300. Although voice or audio signal output is preferably accomplished primarily through the speaker 334, display 322 may also be used to provide an indication of the identity of a calling party, the duration of a voice call, or other voice call related information for example.

Serial port 330 in FIG. 17, would normally be implemented in a personal digital assistant (PDA)-type mobile station for which synchronization with a user's desktop computer (not shown) may be desirable, but is an optional device component. Such a port 330 would enable a user to set preferences through an external device or software application and would extend the capabilities of mobile station 300 by providing for information or software downloads to mobile station 300 other than through a wireless communication network. The alternate download path may for example be used to load an encryption key onto the device through a direct and thus reliable and trusted connection to thereby enable secure device communication.

Other communications subsystems 340, such as a short-range communications subsystem, is a further optional component which may provide for communication between mobile station 300 and different systems or devices, which need not necessarily be similar devices. For example, the subsystem 340 may include an infrared device and associated circuits and components or a Bluetooth™ communication module to provide for communication with similarly enabled systems and devices.

When mobile device 300 is used as a UE, protocol stacks 346 include an apparatus and method for handling cell update during reconfiguration in universal mobile telecommunications system user equipment.

The above-described embodiments of the present application are intended to be examples only. Those of skill in the art may effect alterations, modifications and variations to the particular embodiments without departing from the scope of the application as defined by the appended claims.

We claim:

1. A method of performing a cell update in a user equipment, the user equipment configured for use in a communications system, the method comprising:
receiving a reconfiguration command, the reconfiguration command including an activation time at which a reconfiguration is to be applied;
applying the reconfiguration at the activation time;
detecting a trigger event which indicates that a cell update is required;
cancelling the reconfiguration procedure in response to the trigger event if the trigger event occurs before the reconfiguration has been applied;
setting a configuration failure flag;
completing a cell update; and
sending a configuration failure message, after the cell update is completed if the configuration failure flag is set.

2. A method according to claim 1, comprising cancelling the reconfiguration procedure if the trigger event occurs before the activation time.

3. A method according to claim 1, in which the user equipment is configured to communicate with a UTRAN, farther comprising sending a Reconfiguration_FAILURE message receivable by the UTRAN.

4. User equipment for performing a cell update, the user equipment configured for use in a communications system, the user equipment comprising:
a receiver for receiving a reconfiguration command, the reconfiguration command including an activation time at which a reconfiguration is to be applied and at which the reconfiguration is applied;
an event detector for detecting a trigger event which indicates that a cell update is required;
a controller arranged to cancel the reconfiguration procedure in response to the trigger event if the trigger event occurs before the reconfiguration has been applied;
the controller also being arranged to set a configuration failure flag and to cause the user equipment to transmit a configuration failure message configured to be receivable by the communications system after a cell update if the configuration failure flag is set.

5. User equipment according to claim 4, wherein the controller is arranged to cancel the reconfiguration procedure if the trigger event occurs before the activation time.

6. User equipment according to claim 4, wherein the communications system comprises a UMTS system.

* * * * *